J. CLARK.
MIDDLE RING FOR PIPE COUPLINGS.
APPLICATION FILED MAR. 25, 1907.
898,723.
Patented Sept. 15, 1908.
2 SHEETS—SHEET 1.
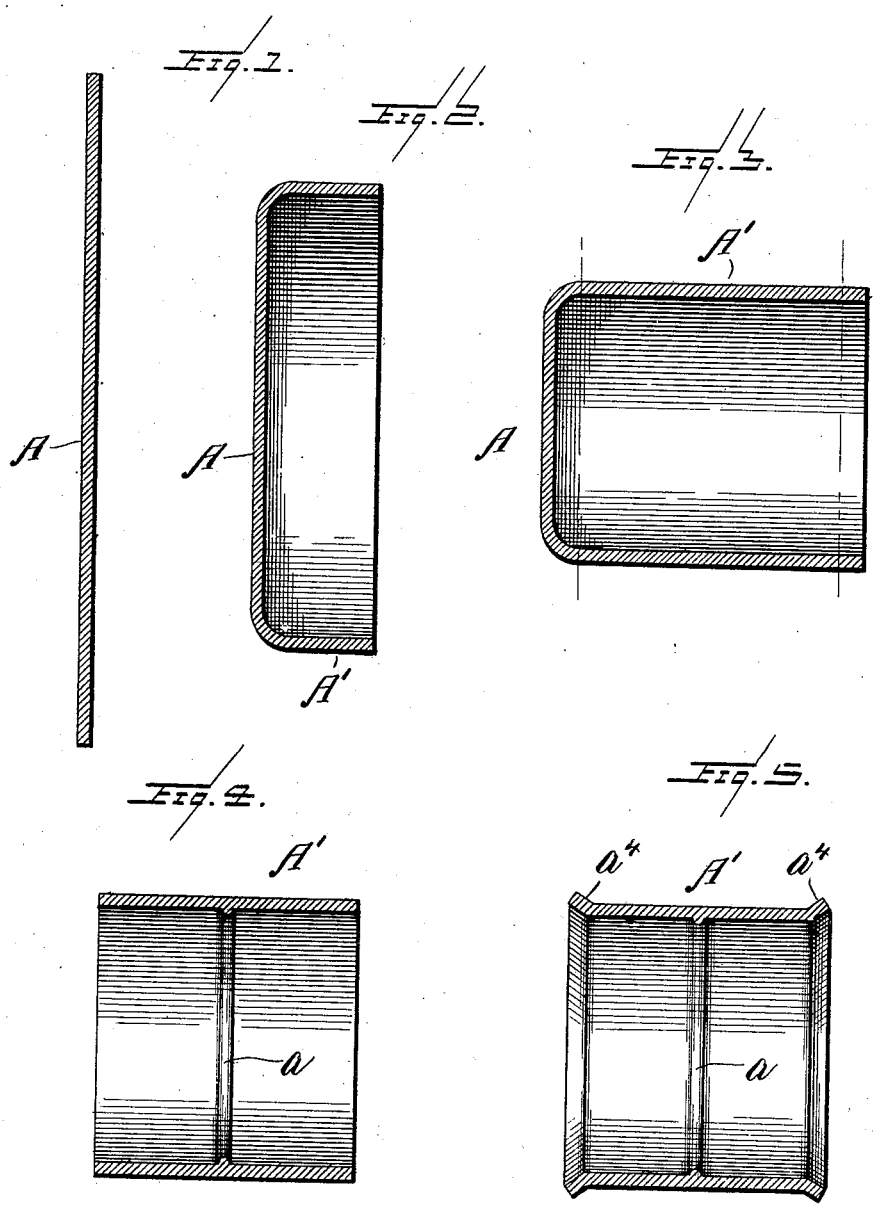

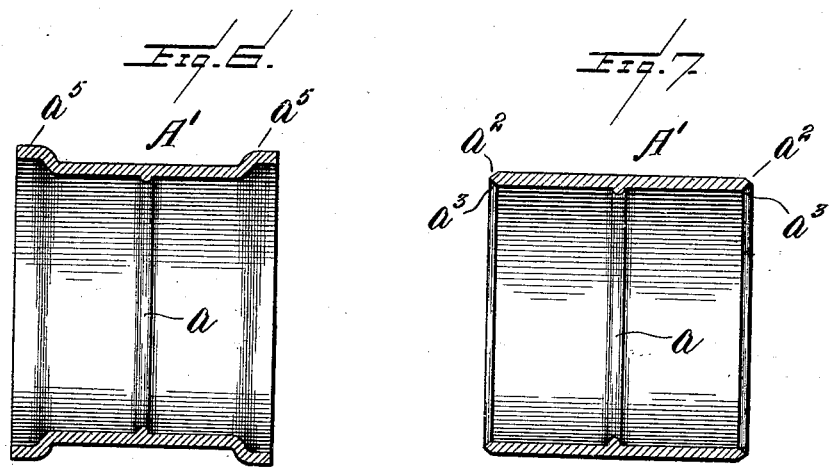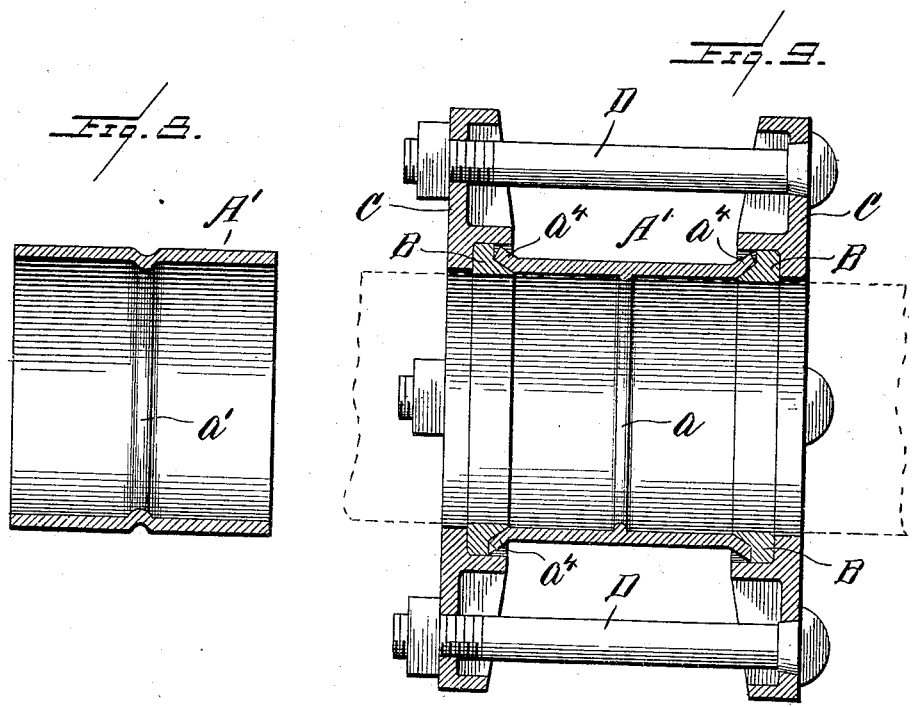

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA.

MIDDLE RING FOR PIPE-COUPLINGS.

No. 898,723.   Specification of Letters Patent.   Patented Sept. 15, 1908.

Application filed March 25, 1907. Serial No. 364,380.

*To all whom it may concern:*

Be it known that I, JAMES CLARK, citizen of the United States, residing at Bradford, in the county of McKean and State of Pennsylvania, have invented certain new and useful Improvements in Middle Rings for Pipe-Couplings; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate several forms in which I have contemplated embodying my invention and said invention is fully disclosed in the following description and claims.

My invention relates to pipe couplings and more particularly to that class of pipe couplings in which a middle ring or sleeve is placed over the meeting ends of plain end pipe sections and a tight joint is effected by the compression of packing rings usually of rubber, which compression is ordinarily accomplished by means of clamping rings between which and the ends of the middle ring or sleeve, the packing rings are inserted, and are compressed upon the pipe sections by means of bolts connecting said clamping rings.

Heretofore the middle rings or sleeves of pipe couplings have generally been made of cast iron and such rings have been found in practice to have sand holes or air holes in them, which would cause them to leak if laid in a pipe line for conducting liquids or gases. In order to prevent leaking of such couplings, therefore, it has been necessary to test each cast iron middle ring by means of a suitable apparatus to ascertain whether or not it is pervious before it is delivered or used and to discard those found to be pervious, and this adds materially to the cost of manufacture of such rings. Recently these middle rings have been made of welded wrought metal but with such welded rings there is always present the possibility of a defective weld which will produce a leak and may cause the ring to open when exposed to high internal pressure, and the further possibility of the metal being burned adjacent to the weld, and thus rendered weak or pervious.

My invention, therefore, consists in a weldless middle ring, in which there is practically no possibility of a leak and moreover, the metal being of practically uniform strength density and texture throughout, there is no danger of its being split or ruptured when exposed to high internal pressure.

In the drawings, I have illustrated one method by which my improved weldless middle ring may be produced, and I have illustrated several forms in which it may be conveniently manufactured.

In the drawings, Figure 1 represents a section of a disk or plate of steel or wrought iron from which my weldless middle ring may be conveniently made. Fig. 2 represents a section of the blank after it has been drawn by suitable dies into a cup shape. Fig. 3 is a similar view of the blank after it has been further drawn by suitable dies and indicating in dotted lines the planes in which the blank may be trimmed to produce a weldless cylinder. Fig. 4 is a sectional view of a weldless sleeve or middle ring having an integral annular bead or stop formed on its interior by upsetting the ring. Fig. 5 is a sectional view of another form of the finished weldless middle ring. Fig. 6 is a similar view of another form of weldless middle ring. Fig. 7 is a similar view of still another form of weldless middle ring. Fig. 8 is a view similar to Fig. 4 showing a weldless ring with a modified form of center stop. Fig. 9 is a sectional view of a complete pipe coupling with the form of ring shown separately in Fig. 5.

In the manufacture of my weldless middle ring I preferably form a weldless cylinder by taking a circular disk or blank A of wrought metal such as steel or wrought iron and subjecting it to the action of suitable dies which draw it and force it into cup shape as indicated in Figs. 2 and 3, so as to produce the weldless cylindrical portion A′, and I may treat the blank with successive dies, until the cylindrical portion A′ is brought to the required diameter, length and thickness. The blank is then preferably trimmed, as indicated in dotted lines Fig. 3, thus producing a weldless cylinder or ring. This weldless cylinder may be used in conjunction with suitable packing rings and with clamping rings or the like but I prefer to provide it with an interior centrally located annular projection or stop for the purpose of centering said ring over the meeting ends of the pipe sections and to provide the end portions of the ring with constructions for facilitating their engagement with the packing rings.

In order to form the centering stop, I preferably operate upon the weldless cylinder A' by suitable dies (not shown) which confine it throughout its length both externally and internally, except for an annular portion around the interior about midway between its ends, and subject it while heated, to an endwise compression or upsetting, thereby forming the integral interior rib or stop a, see Fig. 4. I may, however, form this centering stop by indenting the metal of the ring annularly as shown at a' in Fig. 8 and such indented stop may extend all the way around the interior of the ring or it may be indented at intervals, if desired. I prefer to indent it annularly, however, as shown.

The end portions of the middle ring are preferably constructed with special reference to the packing rings which they are to engage. In Fig. 7 I have shown each end of the ring oppositely beveled to form the oppositely inclined annular faces $a^2$ $a^3$ to engage an annularly grooved packing ring.

In Fig. 5 I have shown the ends of the ring bent outwardly or flared angularly, with respect to the main body of the ring as at $a^4$ to form a packing recess, to engage a suitably formed packing ring.

In Fig. 6 I have shown the ends of the weldless ring expanded, as at $a^5$ $a^5$ to form annular packing recesses, the expanded portions being substantially parallel with the main body of the ring, as shown.

It will be seen that my improved weldless wrought metal middle ring is impervious, and that the metal being of uniform texture, thickness and strength throughout, there is practically no danger of splitting or rupturing the ring when in use. It will also be seen that these rings can be very conveniently and economically manufactured from sheet iron or steel, and that the expensive and tedious testing of each individual ring, which is necessary in the case of cast iron middle rings, is entirely obviated.

In Fig. 9 I have shown a complete pipe coupling comprising the form of middle ring shown in Fig. 5, together with packing rings B, B, clamping rings or flanges C, C and connecting bolts D, D for drawing the clamping rings toward each other and compressing the packing rings to form a tight joint.

What I claim and desire to secure by Letters Patent is:—

1. A middle ring for rubber packed pipe couplings comprising a weldless cylinder of wrought metal, having its ends provided with packing engaging portions, substantially as described.

2. A middle ring for rubber packed pipe couplings comprising a weldless cylinder of wrought metal having its ends provided with packing engaging portions, and having integral inwardly projecting portions on its interior between its ends, substantially as described.

3. A middle ring for rubber packed pipe couplings comprising a weldless cylinder of wrought metal, having its end portions bent outwardly to form packing recesses, and provided interiorly with an annular integral inwardly projecting stop, substantially as described.

4. A middle ring for rubber packed pipe couplings comprising a weldless cylinder of wrought metal, having its ends provided with packing engaging portions, and its interior provided between its ends with annular inwardly projecting upset portions forming a centering stop, substantially as described.

In testimony whereof I affix my signature, in the presence of two witnesses.

JAMES CLARK.

Witnesses:
 F. P. SCHOONMAKER,
 ALBERT S. PATON.